(12) United States Patent
Isobe et al.

(10) Patent No.: US 6,261,356 B1
(45) Date of Patent: Jul. 17, 2001

(54) ASPHALT-ADDITIVE COMPOSITION

(75) Inventors: Kazuo Isobe; Ryoichi Tamaki; Keiichiro Tomioka, all of Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/393,813

(22) Filed: Sep. 10, 1999

(30) Foreign Application Priority Data

Sep. 11, 1998 (JP) .................................................. 10-257998

(51) Int. Cl.$^7$ .................................................. C09D 195/00
(52) U.S. Cl. .................... 106/284.1; 106/246; 106/269; 106/312
(58) Field of Search .................... 106/246, 269, 106/284.1, 312

(56) References Cited

U.S. PATENT DOCUMENTS 2,693,425   11/1954   Hardman .
5,137,572   8/1992   Krivohlavek .

FOREIGN PATENT DOCUMENTS

| 0157210 | 10/1985 | (EP) . |
| 0157210 A1 | 10/1985 | (EP) . |
| 0792918 A2 | 9/1997 | (EP) . |
| 0919588 A1 | 6/1999 | (EP) . |
| 0926191 A2 | 6/1999 | (EP) . |
| 60-188462 | 9/1985 | (JP) . |
| 832832 | 3/1996 | (JP) . |

*Primary Examiner*—David Brunsman
(74) *Attorney, Agent, or Firm*—Birch Stewart Kolasch & Birch, LLP

(57) ABSTRACT

The present invention provides an additive for asphalt which causes an improvement in anti-stripping effect of asphalt from aggregates, and exhibits the effect quickly. That is, the present invention provides an asphalt-additive composition comprising (A) a specific acidic phosphoric acid compound, and (B) at least one member selected from the group consisting of mineral oil, alcohol having 8 to 18 carbon atoms, carboxylic acid having 8 to 18 carbon atoms and triglyceride thereof; with the proviso that the amount of the (B) component is 25–400 parts by weight per 100 parts by weight of the (A) component.

7 Claims, No Drawings

ASPHALT-ADDITIVE COMPOSITION

FIELD OF THE INVENTION

The present invention relates to an asphalt-additive composition with high temperature.

PRIOR ART AND PROBLEMS TO BE SOLVED BY THE INVENTION

When the pavement of a road is carried out by asphalt, aggregates and the asphalt are heated and blended. The adhesion between the asphalt, which is non-polar and hydrophobic, and aggregates, which are hydrophilic, is insufficient. Therefore, there is a drawback that the asphalt is stripped from the aggregates by action of water, such as water from rain or underground water.

A technical theme of improving the adhesion between asphalt and aggregates is a very important problem for improving asphalt pavement. Various methods have been proposed for solving the problem. For example, JP -A 60-188462 and U.S. Pat. No. 2,693,425 describe the use of a specific acidic organic phosphorus compound for asphalt with high temperature. According to these methods, the adhesion and the stripping effect are improved, but there remains a problem on quick effect thereof, which is demanded in the market. That is, in order to exhibit the adhesion and the anti-stripping effect effectively after the phosphorus compound is added to asphalt with high temperature, it is necessary to blend the asphalt and the phosphorus compound sufficiently and homogeneously. For this reason, much time is required for exhibiting the effects sufficiently.

An object of the present invention is to provide an asphalt-additive composition which has a high anti-stripping effect of asphalt from aggregates, and also exhibits the effect quickly.

MEANS FOR SOLVING THE PROBLEMS

The present invention provides an asphalt-additive composition comprising 100 parts by weight of (A) at least one phosphorus compound having the formula (1) and 25 to 400 parts by weight of (B) at least one member selected from the group consisting of mineral oils, alcohols having 8 to 18 carbon atoms, carboxylic acids having 8 to 18 carbon atoms and triglycerides of carboxylic acids having 8 to 18 carbon atoms:

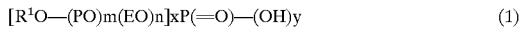

$$[R^1O-(PO)_m(EO)_n]_xP(=O)-(OH)_y \quad (1)$$

in which PO is oxypropylene unit, m is the mole number on the average of added oxypropylene units and ranges from 0 to 4, EO is oxyethylene unit, n is the mole number on the average of added oxyethylene units and ranges from 0 to 6, $R^1$ is a hydrocarbon group having 8 to 22 carbon atoms, x is a number of 1 to 2 and y is a number provided that the sum total of x and y may be 3.

Further, the present invention provides an asphalt composition comprising asphalt and 0.05 to 3.0 percent by weight, per the asphalt, of the additive composition.

The present invention provides a process for producing asphalt comprising mixing aggregates with asphalt in the presence of the additive composition.

The present invention provides use of the additive composition to mix well asphalt with aggregates.

EMBODIMENTS OF THE INVENTION

The (A) component of the asphalt-additive composition of the present invention needs to have a P-OH group. Further, the (A) component may be alone or a mixture of two or more components.

In the formula (1), $R^1$ is a hydrocarbon group having 8 to 22 carbon atoms, is preferably an alkyl, alkenyl or alkylphenyl group having 10 to 20 carbon atoms, and is more preferably an alkyl group having 10 to 18 carbon atoms. More preferably, $R^1$ has a branched group such as a methyl group. Specific examples of $R^1$ include 2-ethylhexyl, octyl, nonyl, decyl, undecyl, dodecyl, tridecyl, tetradecyl, pentadecyl, hexadecyl, heptadecyl, octadecyl, alkyl groups such as alkyl residues of alcohol obtained by oxosynthesis, alkyl groups originating from coconut oil alcohol, which is a mixture thereof, and alkyl phenyl groups such as octyl phenyl and nonylphenyl.

In the formula, m representing the average number of added molecules of oxypropylene is from 0 to 4, preferably from 0 to 3, and more preferably from 0 to 2. In the formula (1), n representing the average number of added molecules of oxyethylene is from 0 to 6, preferably from 0 to 5 and more preferably from 0 to 4. Especially preferably, both of m and n are zero. The order of added oxypropylene and oxyethylene may be optional. The form of the addition thereof may be block addition or random addition, optionally.

In the formula (1), x is from 1 to 2, preferably from 1 to 1.5 and especially preferably 1.0, and y is such a provided number that the sum total of x and y may be 3. That is, the compound of the formula (1) is a monoester or diester of phosphoric acid, or a mixture thereof. The blend ratio thereof may be optional. Even if any one of these compounds is used, anti-stripping effect can be obtained.

The (A) component of the present invention may contain an oligomer (for example, a dimer or a trimer) based on P-O-P bonds resulting from mutual condensation of phosphorus atoms in the compound (1).

The method for producing the compound (1) is not especially limited. However, it is common to comprise gaining a monohydric alcohol having 8 to 22 carbon atoms or a compound obtained by subjecting the compound to addition polymerization with propyleneoxide and/or ethyleneoxide, and converting them into a phosphoric ester. The conversion into the phosphoric ester may be performed in a known manner. The conversion may be performed, for example, by reacting the above-mentioned compound with phosphoric acid anhydride, phosphorus oxytrichloride or phosphorus trichloride.

The mineral oil of the (B) component is preferably kerosene, light oil, heavy oil, anthracene oil, creosote oil, or the like, and is especially preferably kerosene or light oil. The alcohol having 8 to 18 carbon atoms is preferably 2-ethylhexanol, tridecanol, octadecenol, or the like. The carboxylic acid having 8 to 18 carbon atoms is preferably oleic acid, linolenic acid, 2-ethylhexanoic acid, tall oil fatty acid, which is a mixture thereof, or the like. The triglyceride of the carboxylic acid is preferably soybean oil, tall oil, beef tallow, or the like, and especially preferably soybean oil or tall oil. The (B) component is preferably a component having a freezing point or a pour point of 20° C. or less, and is more preferably a component having a freezing point or a pour point of 0° C. or less. Especially preferred are mineral oil and triglyceride meeting this requirement. Specifically, kerosene, soybean oil and tall oil are preferred. The freezing point and the pour point are measured on the basis of JIS K 0065 and JIS K 2269, respectively.

The (B) component is believed to have the function which makes the (A) component improve its compatibility with asphalt appropriately and which makes the (A) component orientate more quickly and effectively at the interface between the asphalt and aggregates.

In the present invention, the (B) component is blended in an amount of 25–400, preferably 50–300 and more preferably 100–300 parts by weight per 100 parts by weight of the (A) component. In this range, the effect that the (B) component causes appropriate improvement in the compatibility of the (A) component with asphalt is exhibited, and improving the orientation of the (A) component at the interface between the asphalt and aggregates. Thus, anti-stripping effect and quick effect are sufficiently exhibited.

The form of the additive composition of the present invention may be any one of solid, liquid and paste forms. From the standpoint of the adhesion, quickness of the anti-stripping effect and workability, the viscosity at 25° C. is preferably 3000 mPa.S or less, more preferably 2000 mPa.S or less and especially preferably 500 mPa.S or less. The viscosity is measured on the basis of JIS Z 8803.

The additive composition of the present invention is used in an amount of 0.05–3.0% by weight, preferably 0.1–2.0% by weight and more preferably 0.15–1.5% by weight of asphalt with a temperature of 100–250° C. In this range, excellent effects are exhibited for the adhesion between asphalt and aggregates and anti-stripping effect of the asphalt from the aggregates.

An asphalt composition is prepared by adding 0.05–3.0% by weight of the asphalt-additive composition of the present invention to asphalt with high temperature, for example, with a temperature of 100–250° C. The method for adding the additive composition of the present invention to the asphalt is not especially limited. For example, however, a given amount of the additive composition is added to asphalt with a temperature of 100–250° C., which is heated or melted in a tank or a tank roller. As described above, the additive composition has good compatibility or affinity with asphalt; therefore, the composition and asphalt are sufficiently and homogeneously mixed by thermal convection or vibration at the time of carriage thereof if they are forced to be mixed. Thus, stirring is unnecessary. However, stirring is preferred when more quick effect is demanded.

Examples of the asphalt used in the present invention include petroleum straight asphalt, semi-blown asphalt, cutback asphalt, natural asphalt, and asphalt produced by adding a softener to petroleum tar, pit or bitumen resulting from solvent deasphalting so as to be suitable for the standard of asphalt for pavement of roads. Further, modified asphalt may also be used in which natural rubber, synthetic rubber, thermoplastic elastomer or a mixture thereof is added to the above-mentioned asphalt in order to raise the consistency of the asphalt. Depending on application, an inorganic filler such as calcium carbonate, slaked lime, cement or activated carbon; an organic filler; variable plasticizers; sulfur and the like may be added to the asphalt used in the present invention.

The asphalt composition obtained by adding the additive composition of the present invention has a good adhesion to all kinds of aggregates, including aggregates in the range from acidic aggregates made mainly of silicic materials to basic aggregates made mainly of lime, and has good anti-stripping effect.

ADVANTAGEOUS EFFECT OF THE INVENTION

The additive composition of the present invention makes the adhesion between asphalt and aggregates intense, and gives very good anti-stripping effect of the asphalt. Moreover, this effect is quickly exhibited after addition having high temperature asphalt is added. For this reason, the additive composition is very useful for practical use.

EXAMPLES

Example 1

A method according to a stripping test of asphalt films described in the manual for asphalt pavement (published by Japan Road Association) was performed.
(Stripping Test Method)

A respective 100 g of aggregates from Takarazuka (quartz porphyry) and aggregates from Kuzu (limestone), which passes through the sieve having an opening of 13 mm and doesn't pass through the sieve having an opening of 5 mm, were sampled, and then washed sufficiently. Next, the aggregates were placed in a 300 ml metal vessel, and then were dried. The aggregates were heated for one hour in a thermostatted drier beforehand kept at 150° C. On the other hand, an asphalt composition was heated for 2 or 48 hours in a thermostatted drier at 180° C. Then, 5.5 g of the asphalt component were added to the above-mentioned aggregates, and were well stirred for 2 to 3 minutes with a spatula to ensure perfect coating of the surface of the aggregates with the asphalt composition. Next, the coated aggregates were spread on a glass plate and allowed to stand for 1 hour for cooling to room temperature. In this way, the asphalt composition was caused to harden. The asphalt coated aggregates were immersed for 90 minutes in hot water in a thermostatted bath kept at 80° C. Thereafter, the coated aggregates in the water were observed from the above, and the area percentage of the asphalt film stripped from the aggregates was obtained from observation with eyes. This percentage is represented as a stripped rate. The results are shown in Table 1.

The asphalt composition was obtained by adding the asphalt-additive composition, described in Table 1, in an amount shown in Table 1, to straight asphalt (penetration degree: 60–80) heated and melted at 180° C., and then blending the resultant with a turbine type stirring fan at 180° C. for a given time.

TABLE 1

| | (A) component | | | | | (B) component | | |
|---|---|---|---|---|---|---|---|---|
| | Structure in the formula (1) | | | | Parts by | Kind | Freezing point (° C.) | Pour point (° C.) | Parts by weight |
| | $R^1$ | m | n | x | weight | | | | |
| Examples of the invention | | | | | | | | | |
| 1 | Dodecyl | 1.5 | 1 | 1 | 100 | Kerosene | — | Less than −10 | 200 |
| 2 | Dodecyl | 1.5 | 1 | 1 | 100 | Light oil | — | −5 | 200 |
| 3 | Dodecyl | 1.5 | 1 | 1 | 100 | Heavy oil | — | 15 | 200 |
| 4 | Tridecyl (1) | 0 | 0 | 1.5 | 100 | Kerosene | — | Less than −10 | 200 |

TABLE 1-continued

| | | | | | | | | | |
|---|---|---|---|---|---|---|---|---|---|
| 5 | Tridecyl (1) | 0 | 0 | 1.5 | 100 | Soybean oil | −10 | — | 200 |
| 6 | Tridecyl (1) | 0 | 0 | 1.5 | 100 | Tall oil | −2 | — | 200 |
| 7 | Tridecyl (1) | 0 | 0 | 1.5 | 100 | Beef tallow | 42 | — | 200 |
| 8 | Dodecyl | 0 | 0 | 1.5 | 100 | Kerosene | — | Less than −10 | 70 |
| 9 | Dodecyl | 0 | 0 | 1.5 | 100 | Kerosene | — | Less than −10 | 200 |
| 10 | Dodecyl | 0 | 0 | 1.5 | 100 | Kerosene | — | Less than −10 | 250 |
| Comparative Examples | | | | | | | | | |
| 1 | — | — | — | — | — | — | — | — | — |
| 2 | Tridecyl (1) | 0 | 0 | 1.5 | 100 | — | — | — | — |
| 3 | — | — | — | — | — | Tall oil | −2 | — | 100 |
| 4 | Tridecyl (1) | 0 | 0 | 1.5 | 100 | Tall oil | −2 | — | 20 |
| 5 | Tridecyl (1) | 0 | 0 | 1.5 | 100 | Tall oil | −2 | — | 500 |
| 6 | Dodecyl | 0 | 0 | 1.5 | 100 | Kerosene | — | Less than −10 | 20 |
| 7 | Dodecyl | 0 | 0 | 1.5 | 100 | Kerosene | — | Less than −10 | 500 |
| 8 | Octadecyl | 0 | 3 | 1.5 | 100 | — | — | — | — |
| 9 | Octadecyl | 0 | 0 | 1.5 | 100 | — | — | — | — |
| 10 | Octadecyl | 0 | 0 | 1.5 | 100 | — | — | — | — |
| 11 | Beef tallow alkylpropylenediamine | | | | 100 | — | — | — | — |
| 12 | Beef tallow alkylpropylenediamine to which 3 moles of EO are added on the average | | | | 100 | — | — | — | — |
| 13 | Beef tallow alkylpropylenediamine | | | | 100 | Tall oil | −2 | — | 200 |

| | Composition | | Time for mixing (minute) | Stripped rate (%) | | | |
|---|---|---|---|---|---|---|---|
| | Viscosity at 25° C. (mPa · S) | Blended amount (% by weight) | | Quartz porphyry | | Limestone | |
| | | | | 2 hours | 48 hours | 2 hours | 48 hours |
| Examples of the invention | | | | | | | |
| 1 | 45 | 1 | 1 | 0 | Less than 5 | 0 | 0 |
| 2 | 110 | 1 | 1 | 0 | Less than 5 | 0 | 0 |
| 3 | 420 | 1 | 1 | 5 | 10 | 5 | 5 |
| 4 | 94 | 1 | 1 | 0 | Less than 5 | 0 | 0 |
| 5 | 120 | 1 | 1 | Less than 5 | Less than 5 | 0 | Less than 5 |
| 6 | 140 | 1 | 1 | Less than 5 | Less than 5 | 0 | Less than 5 |
| 7 | 920 | 1 | 1 | 10 | 15 | 5 | 5 |
| 8 | 1400 | 0.57 | 1 | 0 | Less than 5 | 0 | 0 |
| 9 | 84 | 1 | 1 | 0 | Less than 5 | 0 | 0 |
| 10 | 62 | 1.17 | 1 | 0 | Less than 5 | 0 | 0 |
| Comparative Examples | | | | | | | |
| 1 | — | — | — | 60 | 80 | 40 | 70 |
| 2 | 850 | 0.5 | 1 | 10 | 25 | 10 | 15 |
| 3 | 48 | 0.5 | 1 | 60 | 80 | 40 | 70 |
| 4 | 610 | 0.4 | 1 | 10 | 25 | 10 | 15 |
| 5 | 82 | 2 | 1 | 20 | 35 | 20 | 25 |
| 6 | Solid | 0.4 | 1 | 30 | 25 | 15 | 15 |
| 7 | 34 | 2 | 1 | 20 | 40 | 15 | 25 |
| 8 | Solid | 0.5 | 1 | 20 | 30 | 10 | 20 |
| 9 | Solid | 0.5 | 1 | 30 | 20 | 20 | 20 |
| 10 | Solid | 0.5 | 30 | 10 | 20 | 10 | 20 |
| 11 | Solid | 0.5 | 30 | 20 | 60 | 10 | 50 |
| 12 | 340 | 0.5 | 30 | 30 | 60 | 10 | 40 |
| 13 | 45 | 0.5 | 30 | 20 | 70 | 10 | 50 |

*The hours related to the stripped rate were hours for heating the asphalt composition. (The same is applied hereinafter.)

(Note)

In Table 1, "Tridecyl (1)" and "Tridecyl (3)" are groups, in which the total carbon number is 13, originating from "Diadol 115" (tridecanol, having one methyl group on the average as branched chain(s) and made by Mitsubishi Chemical Corp.) and "Tridecanol" (tridecanol, having three methyl groups on the average as branched chain(s) and made by Kyowa Hakko Kogyo Co., Ltd.). The blended amount of the composition is "% by weight" relative to the total weight of the asphalt. The time for mixing is a mixing time after the composition was added to the asphalt. The "2 hours" and "48 hours" related to the stripped rate are hours for heating the asphalt composition. The "less than 5" related to the stripped rate means "0<stripped area (%)<5". These are also applied to Example 2.

(Results)

As shown in Table 1, the additive compositions for asphalt of Examples 1–10 of the present invention exhibited more intense adhesion to both of aggregates made of the acidic rocks and basic rocks only by mixing for a short time than amine additives that were used in the prior art (Comparative Examples 11 and 12). The effect was not lost even by heating for a long time. On the other hand, it can be understood from Comparative Examples 2 and 3 that the (A)

component alone or the (B) component alone did not give any effect onto adhesion, but it can be understood from Examples 1–10 of the present invention that use of the both of them causes an improvement in anti-stripping effect. Comparative Example 13 demonstrates that the stripping effect was not improved even by using the (B) component together with the amine additive composition used in the prior art. Thus, it can be said that the effect of the additive composition of the present invention is unique. Especially, it can be understood from comparison of Examples 1 and 2 with Example 3 or comparison of Examples 4–6 with Example 7 that preferred are kerosene, light oil, soybean oil and tall oil having a freezing point or a pour point of 0° C. or less, as the (B) component. Further, it can also be understood from comparison of Example 6 with Comparative Examples 4 and 5, or Examples 8–10 with Comparative Examples 6 and 7 that good results can be obtained when the blended amount of the (B) component is in the range of 25 to 400 parts by weight per 100 parts by weight of the (A) component.

Example 2

Additive compositions for asphalt shown in Table 2 were used to perform the same test as in Example 1. The results are shown in Table 2. It is then noted that the component (A) from Examples 29 and 30, which has $R^1$ having a branched chain provides a high anti-stripping effect even at the mixing time of zero.

TABLE 2

|  | (A) component | | | | | (B) component | | | |
|---|---|---|---|---|---|---|---|---|---|
|  | Structure in the formula (1) | | | | Parts by |  | Freezing point | Pour point | Parts by |
|  | $R^1$ | m | n | x | weight | Kind | (° C.) | (° C.) | weight |
| Examples of the invention | | | | | | | | | |
| 12 | Dodecyl | 0 | 0 | 1.5 | 100 | Kerosene | — | Less than −10 | 200 |
| 13 | Dodecyl | 0 | 0 | 1 | 100 | Kerosene | — | Less than −10 | 200 |
| 14 | Tridecyl (1) | 0 | 0 | 1.5 | 100 | Kerosene | — | Less than −10 | 70 |
| 15 | Tridecyl (1) | 0 | 0 | 1.5 | 100 | Kerosene | — | Less than −10 | 70 |
| 16 | Tridecyl (1) | 0 | 0 | 1 | 100 | Tall oil | −2 | — | 200 |
| 17 | Tridecyl (3) | 0 | 0 | 1.5 | 100 | Soybean oil | −10 | — | 200 |
| 18 | 2-Ethylhexyl | 0 | 0 | 1.5 | 100 | 2-Ethyl hexanol | Less than −10 | — | 200 |
| 19 | Octyl | 1 | 1 | 1.5 | 100 | Tall oil | −2 | — | 200 |
| 20 | Coconut oil alkyl group | 2 | 1 | 1.5 | 100 | Tall oil | −2 | — | 200 |
| 21 | Octadecyl | 0 | 3 | 1.5 | 100 | Tall oil | −2 | — | 200 |
| 23 | Tridecyl (1) | 0 | 0 | 1.5 | 100 | Kerosene | — | Less than −10 | 200 |
| 24 | Nonylphenyl | 0 | 3 | 1.5 | 100 | Kerosene | — | Less than −10 | 200 |
| 25 | Dodecyl | 0 | 0 | 1 | 100 | Kerosene | — | Less than −10 | 200 |
| 26 | Dodecyl | 1.5 | 1 | 1 | 100 | Kerosene | — | Less than −10 | 200 |
| 27 | Tetradecyl | 2 | 4 | 1.5 | 100 | Tall oil fatty acid | 2 | — | 200 |
| 28 | Dodecyl | 0 | 0 | 1 | 100 | Kerosene | — | Less than −10 | 200 |
| 29 | Tridecyl (3) | 0 | 0 | 1 | 100 | Kerosene | — | Less than −10 | 200 |
| 30 | 2-Ethylhexyl | 0 | 0 | 1 | 100 | Kerosene | — | Less than −10 | 200 |
| Comparative Examples | | | | | | | | | |
| 14 | Dodecyl | 6 | 0 | 1.5 | 100 | Kerosene | — | Less than −10 | 200 |
| 15 | Tetradecyl | 0 | 8 | 1.5 | 100 | Tall oil fatty acid | 2 | — | 200 |

|  | Composition | | Time for | Stripped rate (%) | | | |
|---|---|---|---|---|---|---|---|
|  | Viscosity at 25° C. | Blended amount | mixing | Quartz porphyry | | Limestone | |
|  | (mPa · S) | (% by weight) | (minute) | 2 hours | 48 hours | 2 hours | 48 hours |
| Examples of the invention | | | | | | | |
| 12 | 84 | 0.75 | 1 | 15 | 15 | 5 | 10 |
| 13 | 100 | 0.75 | 1 | Less than 5 | 10 | Less than 5 | Less than 5 |
| 14 | 180 | 0.57 | 1 | 0 | Less than 5 | 0 | 0 |
| 15 | 180 | 0.43 | 1 | 10 | 15 | Less than 5 | 5 |
| 16 | 190 | 1 | 1 | 0 | Less than 5 | 0 | 0 |
| 17 | 120 | 1 | 1 | 5 | 10 | Less than 5 | 5 |
| 18 | 79 | 1 | 1 | Less than 5 | 5 | Less than 5 | Less than 5 |
| 19 | 140 | 1 | 1 | Less than 5 | 5 | Less than 5 | Less than 5 |
| 20 | 160 | 1 | 1 | 0 | Less than 5 | 0 | Less than 5 |
| 21 | 1800 | 1 | 1 | 0 | 5 | 0 | Less than 5 |

TABLE 2-continued

| | | | | | | | |
|---|---|---|---|---|---|---|---|
| 23 | 94 | 1 | — | 0 | Less than 5 | 0 | 0 |
| 24 | 67 | 1 | 1 | 5 | 10 | Less than 5 | Less than 5 |
| 25 | 100 | 1 | 1 | 0 | Less than 5 | 0 | 0 |
| 26 | 45 | 1 | 1 | 0 | Less than 5 | 0 | 0 |
| 27 | 110 | 1 | 1 | Less than 5 | Less than 5 | 0 | Less than 5 |
| 28 | 100 | 1 | 0 | 5 | 15 | 5 | 10 |
| 29 | 69 | 1 | 0 | Less than 5 | 5 | Less than 5 | 5 |
| 30 | 65 | 1 | 0 | Less than 5 | 5 | Less than 5 | 5 |
| Comparative Examples | | | | | | | |
| 14 | 91 | 1 | 1 | 25 | 40 | 15 | 30 |
| 15 | Solid | 1 | 1 | 35 | 30 | 20 | 25 |

(Results)

As shown in Examples of the present invention in Table 2, use of the various (A) components together with the various (B) components makes it possible to obtain additive compositions for asphalt which have a low stripped rate, that is, a high anti-stripping effect even by the mixing for a short time. Further, it can be understood from comparison of Examples 25 and 26 with Comparative Example 14 that good results can be obtained when m in the formula (1) is in the range of 0 to 4. And then, it can also be understood from comparison of Example 27 with Comparative Example 15 that good results can be obtained when n in the formula (1) is in the range of 0 to 6.

What is claimed is:

1. An asphalt-additive composition comprising 100 parts by weight of (A) at least one phosphorus compound having the formula (1) and 25 to 400 parts by weight of (B) at least one member selected from the group consisting of mineral oils, alcohols having 8 to 18 carbon atoms, carboxylic acids having 8 to 18 carbon atoms and triglycerides of carboxylic acids having 8 to 18 carbon atoms:

$$[R^1O-(PO)_m(EO)_n]_xP(=O)-(OH)_y \quad (1)$$

in which PO is oxypropylene unit, m is the mole number on the average of added oxypropylene units and ranges from 0 to 4, EO is oxyethylene unit, n is the mole number on the average of added oxyethylene units and ranges from 0 to 6, $R^1$ is a hydrocarbon group having 8 to 22 carbon atoms, x is a number of 1 to 2 and y is a number provided that the sum total of x and y is 3.

2. The composition as claimed in claim 1, which has a viscosity of 3000 mPa. S or less at 25° C.

3. The composition as claimed in claim 1, in which $R^1$ of (A) is an alkyl having 8 to 22 carbon atoms.

4. The composition as claimed in claim 1, in which (B) has a freezing point or pour point of 20° C. or lower.

5. The composition as claimed in claim 1, in which $R^1$ has a ranched group.

6. An asphalt composition comprising asphalt and 0.05 to 3.0 percent by weight, per the asphalt, of the additive composition as defined in claim 1.

7. A process for producing asphalt comprising mixing aggregates th asphalt in the presence of the additive composition as defined in claim 1.

* * * * *